(12) United States Patent
DeLeeuw

(10) Patent No.: US 8,772,724 B2
(45) Date of Patent: Jul. 8, 2014

(54) LOW POWER, INEXPENSIVE VELOCITY DETECTION USING A PIR ARRAY

(75) Inventor: William C. DeLeeuw, Portland, OR (US)

(73) Assignee: Intel-GE Care Innovations LLC, Roseville, CA (US)

( * ) Notice: Subject to any disclaimer, the term of this patent is extended or adjusted under 35 U.S.C. 154(b) by 855 days.

(21) Appl. No.: 12/984,713

(22) Filed: Jan. 5, 2011

(65) Prior Publication Data
US 2012/0168627 A1    Jul. 5, 2012

(51) Int. Cl.
*G01S 3/00* (2006.01)
(52) U.S. Cl.
CPC ........................................ *G01S 3/00* (2013.01)
USPC ...................... 250/340; 250/338.1; 250/338.3
(58) Field of Classification Search
CPC .......................................................... G01S 3/00
USPC ............ 250/340, 338.1, 338.3, 349, 342, 239
See application file for complete search history.

(56) References Cited

U.S. PATENT DOCUMENTS

| 4,479,056 A * | 10/1984 | Zierhut .......................... 250/342 |
| 7,800,049 B2 * | 9/2010 | Bandringa et al. ............ 250/239 |
| 2007/0023662 A1 * | 2/2007 | Brady et al. ................. 250/338.3 |
| 2011/0210253 A1 * | 9/2011 | Micko ........................... 250/349 |

OTHER PUBLICATIONS

Kim et al.,"Resident Location-Recognition Algorithm Using a Bayesian Classifier in the PIR Sensor-Based Indoor Location-Aware System", IEEE Transactions on Systems, Man, and Cybernetics—Part C: Applications and Reviews, vol. 39, No. 2, Mar. 2009, pp. 240-245.

* cited by examiner

*Primary Examiner* — David Porta
*Assistant Examiner* — Faye Boosalis
(74) *Attorney, Agent, or Firm* — Pillsbury Winthrop Shaw Pittman LLP

(57) ABSTRACT

Methods and systems may include a system including a first passive motion sensor having a lateral field of view with a first edge and a second passive motion sensor having a lateral field of view with a second edge that is substantially parallel to the first edge. The first and second edges can define a virtual beam. The system may also include logic to receive signals from the first and second passive motion sensors and determine a gait velocity and level of activity based on the signals from the first and second passive motion sensors.

20 Claims, 6 Drawing Sheets

LOW POWER, INEXPENSIVE VELOCITY DETECTION USING A PIR ARRAY

BACKGROUND

1. Technical Field

Embodiments generally relate to motion sensing. More particularly, embodiments relate to the use of virtual sensing beams to determine spatial gait parameters in a passive motion sensing environment.

2. Discussion

Existing techniques for measuring the velocity of a human in a home can be inaccurate, expensive, power inefficient, damaging to the installation structure, and potentially hazardous. For example, active solutions such as infrared beam-based systems can be power inefficient. Other solutions might involve wearable devices, but the devices must be remembered by the individual in question. Additionally, floor sensors may require carpet modification or the addition of a relatively expensive pressure floor mat that could pose a trip hazard.

Solutions that use a passive infrared (PIR) sensor may be more power efficient than active solutions, but can suffer from inherent limitations of PIR sensor accuracy. For example, existing PIR sensor devices might sense motion in a single downward facing wedge shaped three-dimensional space, which, due to its spread over distance, can make velocity measurements uncertain. Furthermore, because PIR sensors may not be as accurate when approached at angles non-orthogonal to the edge of the sensing edge, a walker moving down a hallway could trigger the PIR sensor under an imprecise geometry. Simply put, there remains considerable room for improvement with regard to motion sensing and gait analysis.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Embodiments may involve a method in which signals are received from a first passive motion sensor and a second passive motion sensor, wherein the first passive motion sensor has a lateral field of view with a first edge. The second passive motion sensor can have a lateral field of view with a second edge that is substantially parallel to the first edge so that the first and second edges define a virtual beam. The method may also involve determining a gait velocity based on signals from the first and second passive motion sensors.

Embodiments can also provide for an apparatus including a first passive motion sensor having a lateral field of view with a first edge, and a second passive motion sensor having a lateral field of view with a second edge that is substantially parallel to the first edge. The first and second edges may define a first virtual beam.

Other embodiments may provide for a system including a first passive motion sensor having a lateral field of view with a first edge, and a second passive motion sensor having a lateral field of view with a second edge that is substantially parallel to the first edge. The first and second edges may define a first virtual beam. The system can further include logic to receive signals from the first and second passive motion sensors, and determine a gait velocity based on the signals from the first and second passive motion sensors.

Figure 1A:
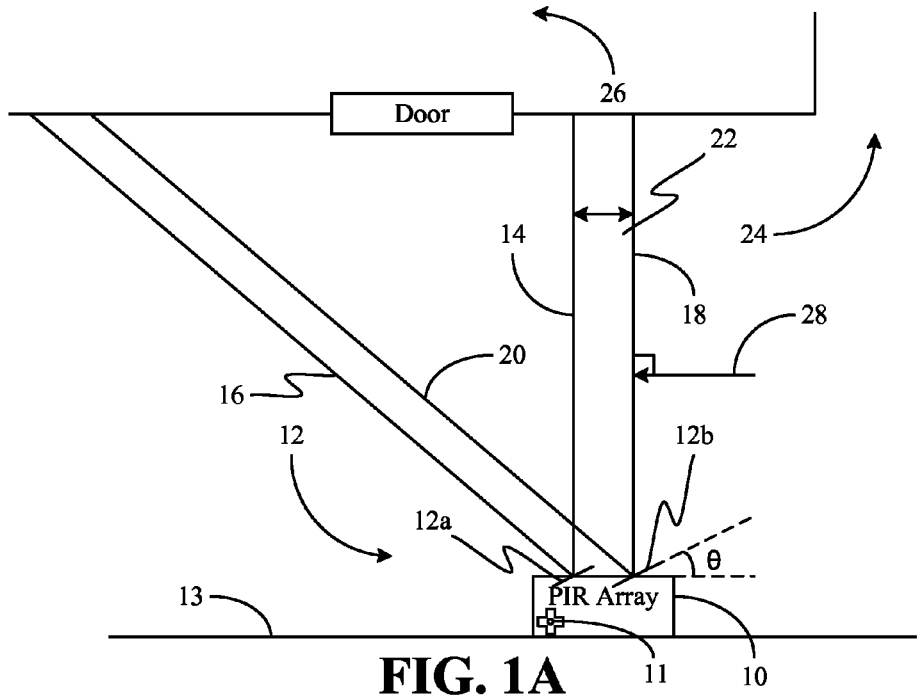
FIGS. 1A and 1B are top views of examples of sensor arrays having a substantially two-dimensional virtual sensing beam according to an embodiment.

FIG. 1A shows a passive infrared (PIR) sensor array 10 having a plurality of PIR sensors 12 (12a, 12b) installed in a hallway environment. Generally, each PIR sensor 12 is passive in that it does not emit energy and can detect the movement of nearby individuals by reading relative energy (e.g., heat) changes in the field of view of the sensor 12. In particular, a first PIR sensor 12a has a lateral (e.g., side-to-side) field of view defined by a rightmost edge 14 and a leftmost edge 16. Similarly, a second PIR sensor 12b has a lateral field of view defined by a rightmost edge 18 and a leftmost edge 20. In the illustrated example, each sensor 12 is mounted at an angle θ so that its field of view is generally tilted to the left. As a result, the rightmost edge 14 of the first PIR sensor 12a and the rightmost edge 18 of the second PIR sensor 12b are substantially parallel to one another and define a uniform virtual beam 22 that can be tightly controlled to detect motion in a relatively small sensing area. Accordingly, activity in areas falling outside the virtual beam 22 such as area 24 or area 26 (if the illustrated door is left open) can be eliminated from consideration by the PIR sensor array 10. Moreover, because a direction 28 of expected travel down the hallway (e.g., the longitudinal axis of the hallway) is substantially perpendicular to the virtual beam 22, the reliability and certainty of the PIR sensor array 10 can be substantially increased. The illustrated PIR sensor array 10 is also equipped with a leveling indicator 11 to facilitate in the installation of the PIR sensor array 10 against a wall 13. Thus, the leveling indicator 11 may be particularly advantageous in environments in which the wall 13 has a tilt of its own.

Figure 1B:
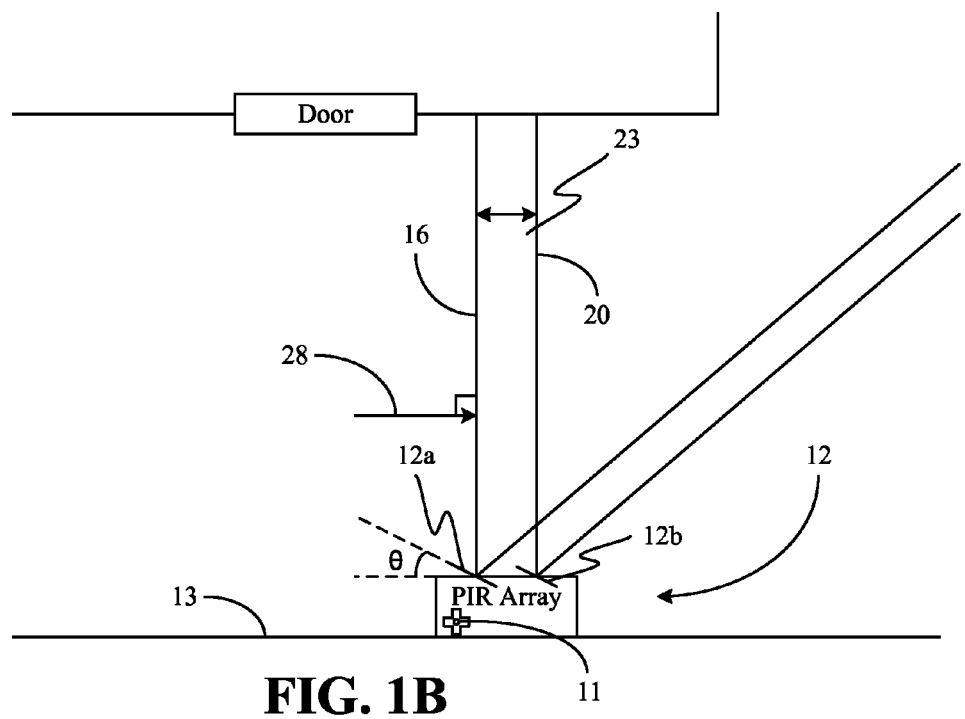

FIG. 1B demonstrates that a virtual beam 23 might also be obtained by tilting the PIR sensors 12 to the left. As a result, the virtual beam 23 in the illustrated example is formed from the leftmost edge of the first PIR sensor 12a and the leftmost edge 20 of the second PIR sensor 12b. Moreover, the PIR sensors 12 need not be tilted in the same direction (i.e., one could be tilted to the left and the other to the right, or vice versa). Additionally, the PIR sensors 12 could be tilted up or down as appropriate.

Figure 2:
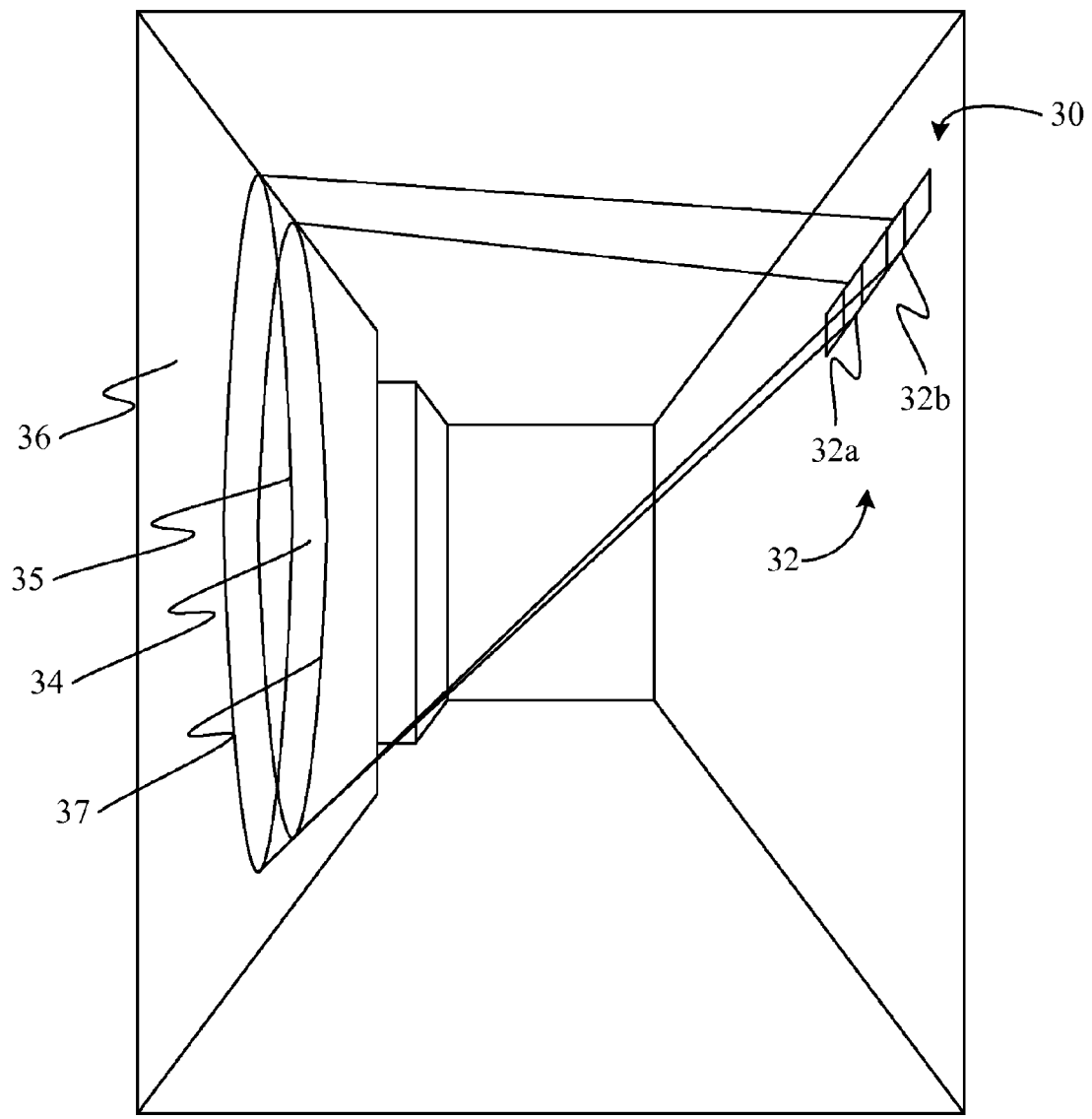
FIG. 2 is a side view of an example of a sensor array having a substantially two-dimensional virtual sensing beam according to an embodiment.

Turning now to FIG. 2, a side view is shown in which a sensor array 30 is mounted to the wall of a hallway. The illustrated sensor array 30 includes a pair of horizontally positioned passive motion sensors 32 (32a, 32b) having lateral fields of view with edges 35, 37 that provide a substantially two-dimensional (e.g., planar) vertical virtual beam with a footprint 34 on an opposing wall 36. In the illustrated example, the rightmost edge 35 of the field of view of a first passive motion sensor 32a and the rightmost edge 37 of the field of view of a second passive motion sensor 32b produce the virtual beam. Although the illustrated fields of view are conical in shape, other shapes such as pyramids might also be provided by the passive motion sensors 32.

Figure 3:
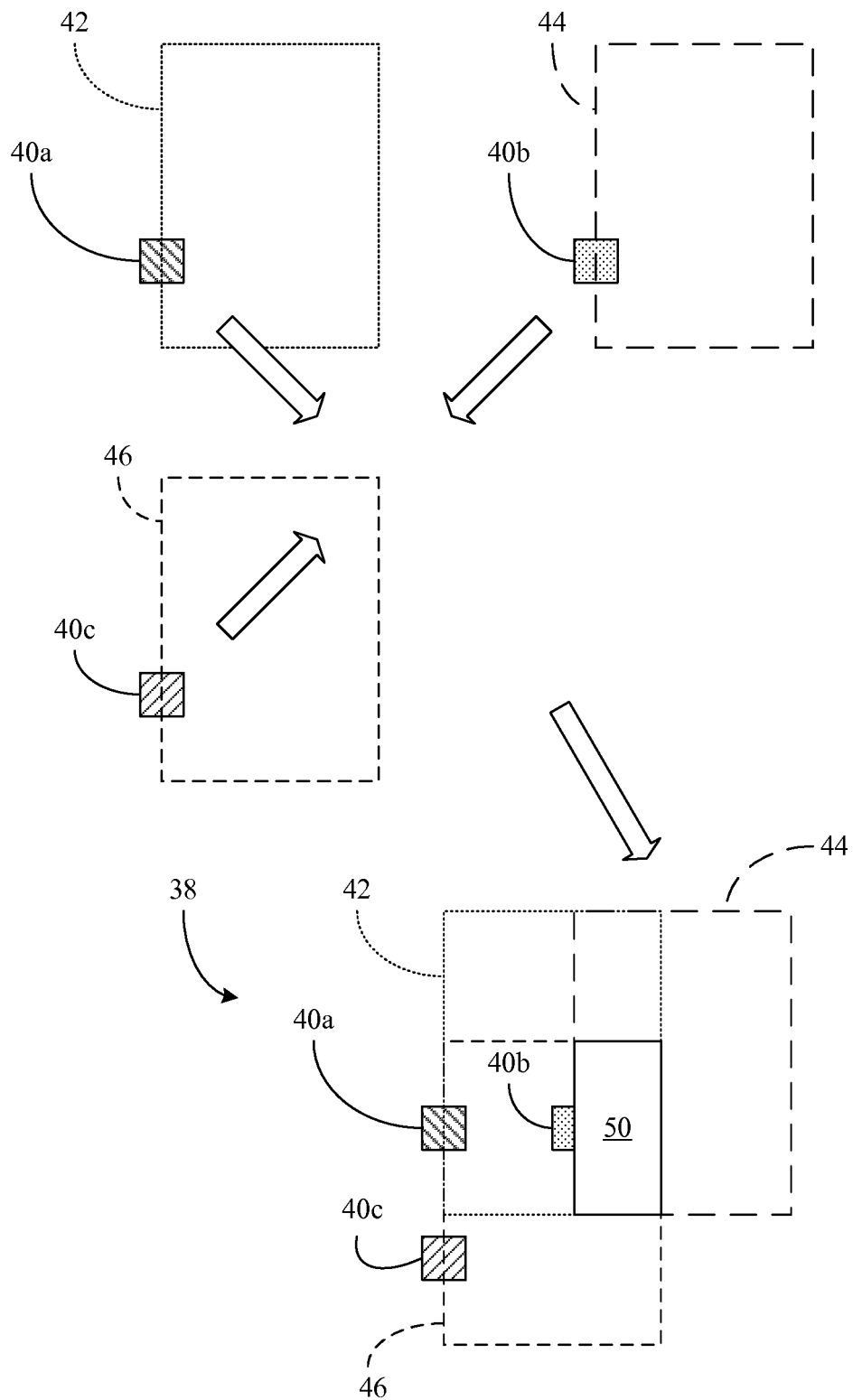
FIG. 3 is a front view of an example of a sensor array having a substantially one-dimensional virtual sensing beam according to an embodiment.

FIG. 3 shows a front view of a sensor array 38 having three passive motion sensors 40 (40a-40c). In the illustrated example, a first passive motion sensor 40a has a field of view that projects to a perimeter 42, which is skewed upward and to the side due to an intentional tilt angle of the first passive motion sensor 40a. A second passive motion sensor 40b is disposed beside (i.e., horizontal to) the first passive motion sensor 40a and has a field of view that projects to a perimeter 44. Similarly, a third passive motion sensor 40c can project to a perimeter 46, wherein the third passive motion sensor 40c may be disposed beneath (e.g., vertical to) the first and second passive motion sensors 40a, 40b. The edges of the perimeters 42, 44, 46 can be positioned to overlap and define a lateral virtual beam 50 that is substantially one-dimensional (e.g., the longitudinal dimension is much greater than the other two dimensions). The illustrated approach can be particularly useful in an environment with pets because the lateral virtual beam 50 can be placed at a height to detect only humans (e.g., average shoulder height). In the illustrated example, when all four passive motion sensors are triggered, it can be determined that an individual is within the lateral virtual beam 50.

Figure 4:
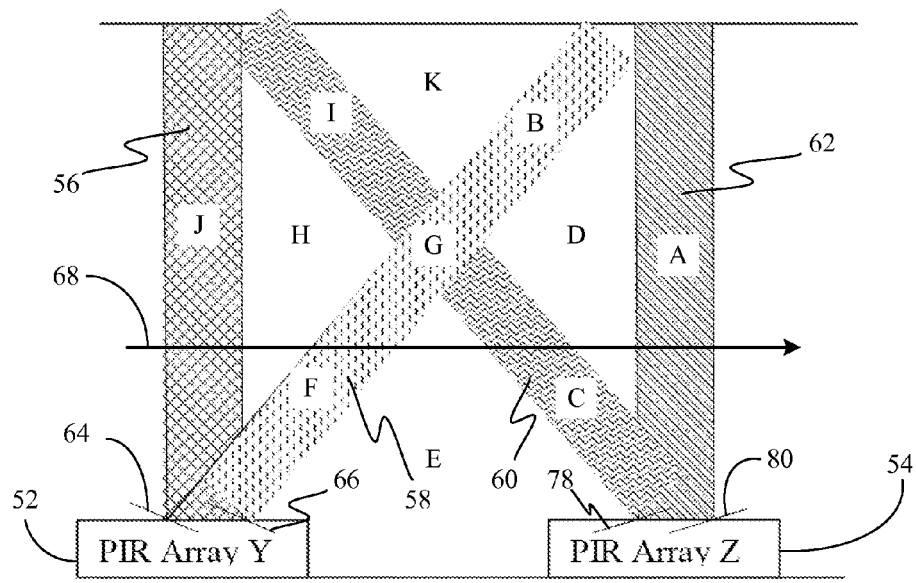
FIG. 4 is a top view of an example of a system having a pair of sensor arrays according to an embodiment.

Turning now to FIG. 4, another approach is shown in which a plurality of sensor arrays 52, 54 are used to partition an area into a plurality of zones (i.e., zones "A" through "K"). In the illustrated example, the passive motion sensors of a first sensor array ("PIR Array Y") 52 are angled to the right and have fields of view edges that define a first virtual beam 56 and a second virtual beam 58, and the passive motion sensors of a second sensor array ("PIR Array Z") 54 are angled to the left and have fields of view edges that define a third virtual beam 60 and a fourth virtual beam 62.

Figure 6:
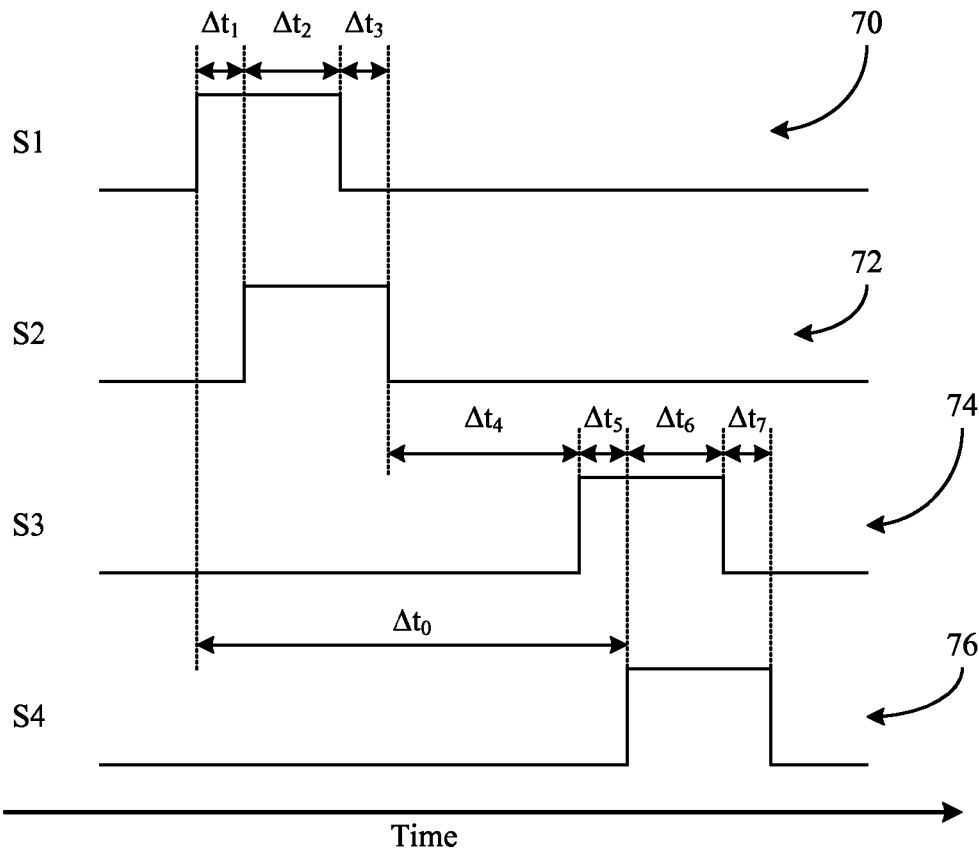
FIG. 6 is a signal diagram of an example of a set of signals from a plurality of sensor arrays according to an embodiment.

With continuing reference to FIGS. 4 and 6, example output signals from the passive motion sensors of the first and second sensor arrays 52, 54 are shown for a scenario in which an individual walks along a path 68 though the partitioned area. In general, the output signals transition to a high value (i.e., exhibit a rising edge transition) when motion is detected by the corresponding passive motion sensor and remain high until motion is no longer detected. Additionally, a lack of detected motion can cause the output signals to transition to a low value (i.e., exhibit a falling edge transition). Alternative signaling schemes such as an inverted scheme in which a rising edge transition corresponds to a lack of detected motion and a falling edge transition corresponds to detected motion, or a level based scheme in which one voltage level corresponds to detected motion and another voltage level corresponds to a lack of detected motion, might also be used.

In the illustrated example, a first output signal 70 from a first passive motion sensor ("S1") 64 contains a rising edge transition that indicates entry of the individual into zone "J" and begins time period $\Delta t_1$. When a second output signal 72 from a second passive motion sensor ("S2") 66 exhibits a rising edge transition it can be determined that the individual has entered zone "H" corresponding to time period $\Delta t_2$. A falling edge transition in the first output signal 70 can indicate that the individual has left the field of view of the first passive motion sensor 64 and entered zone "F", which corresponds to time period $\Delta t_3$. When the second output signal 72 exhibits a falling edge transition, it can be determined that the individual has entered zone "E" associated with time period $\Delta t_4$. Similarly, third and fourth output signals 74, 76 from third and fourth passive motion sensors 78, 80, respectively, can be used to detect the individual's passage through zones "C" (corresponding to time period $\Delta t_5$), "D" (corresponding to time period $\Delta t_6$), and "A" (corresponding to time period $\Delta t_7$).

In addition to detecting the presence of the individual in the various zones, the illustrated approach enables detection of staggering walking patterns. For example, if the path 68 is not straight, movement might be detected in other zones such as zone "I" or "B". Moreover, the illustrated approach enables determinations of gait velocity to be made. For example, because the width (e.g., distance between edges) of the first virtual beam 56 is known, the time period $\Delta t_1$ can be used to determine the gait velocity of the individual while in zone "J", wherein the gait velocity is the beam width divided by the time period $\Delta t_1$. Similar gait velocities can be calculated for movement through each of the other virtual beams, and the individual gait velocities might be averaged together on a weighted or non-weighted basis as appropriate. Additionally, a gait velocity calculation can be made for the time period $\Delta t_0$ between the initial rising edge transitions for the first passive motion sensor 64 and the fourth passive motion sensor 80 (e.g., across multiple arrays).

Figure 7:
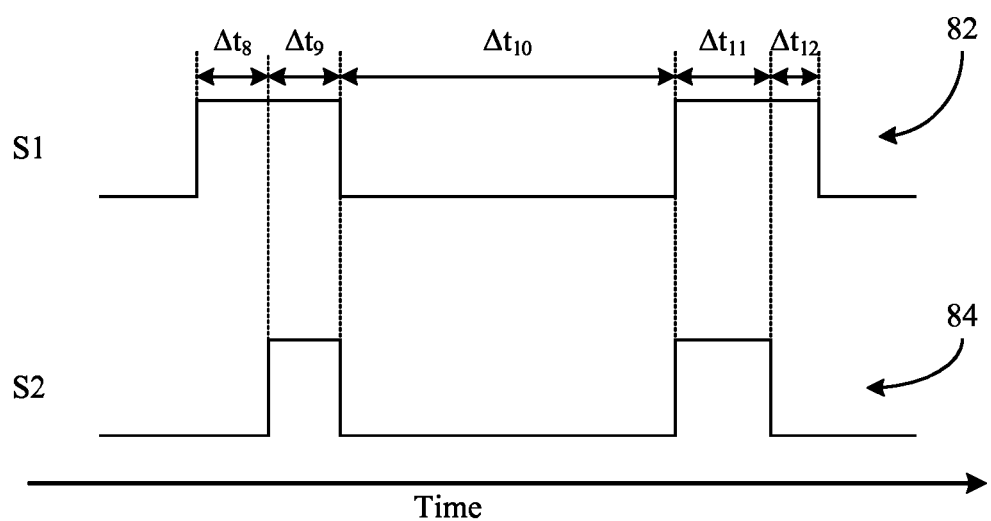
FIG. 7 is a signal diagram of an example of a set of signals from a sensor array according to an embodiment.

With continuing reference to FIGS. 4 and 7, a set of output signals is shown in which an individual stops within a zone of the partitioned area and turns around. In the illustrated example, an output signal 82 of the first passive motion sensor 64 contains a rising edge transition that indicates entry of the individual into zone "J" and begins time period $\Delta t_8$. When a second output signal 84 from the second passive motion sensor 66 exhibits a rising edge transition it can be determined that the individual has entered zone "H" corresponding to time period $\Delta t_9$. A concurrent falling edge transition in both output signals 82, 84 can indicate that the individual has stopped moving within zone "H", corresponding to time period $\Delta t_{10}$. The falling edge transitions need not be exactly concurrent so long as the time difference between the two transitions would not reasonably be attributable to the individual passing through a virtual beam (e.g., concurrence can be dependent upon a velocity threshold being exceeded).

In the illustrated example, a concurrent rising edge transition in both output signals 82, 84 may indicate that the individual has started moving again in zone "H", corresponding to time period $\Delta t_{11}$. The individual's reentry to zone "J" can be detected based on a falling edge transition in the output signal 84 of the second passive motion sensor 66 while the output signal 82 of the first passive motion sensor 64 remains high, wherein time period $\Delta t_{12}$ corresponds to such reentry. The individual's exit from the monitored area may be indicated by the final illustrated falling edge transition in the output signal 82.

Figure 5:
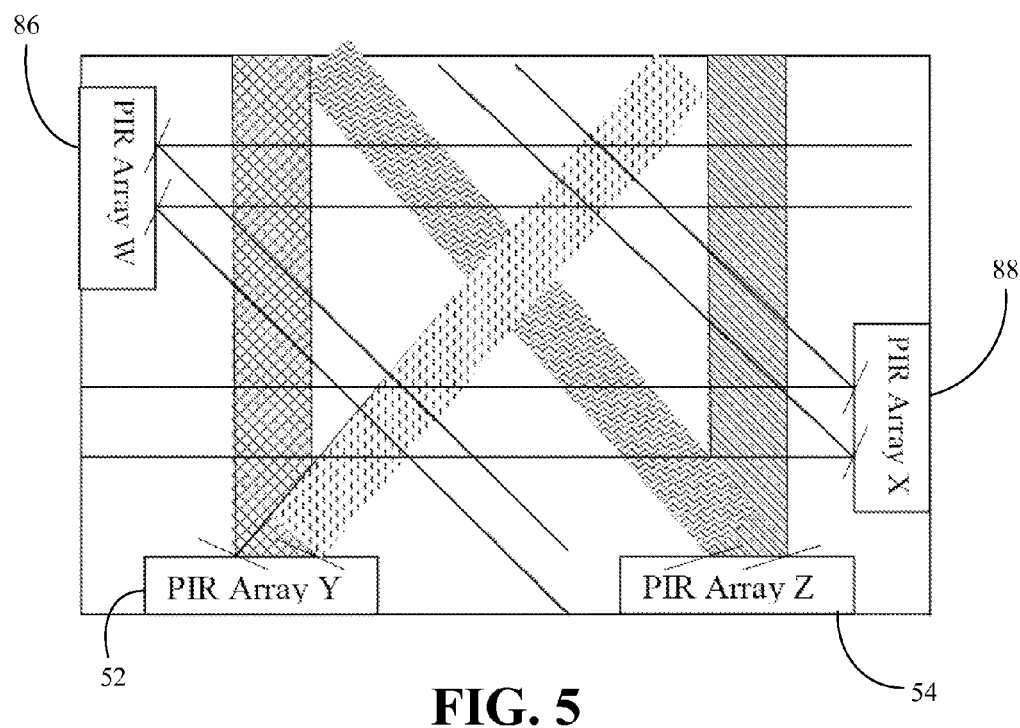
FIG. 5 is a top view of an example of a system having four sensor arrays according to an embodiment.

FIG. 5 demonstrates that a monitored area may be partitioned into an even larger number of zones. In the illustrated example, additional sensor arrays such as sensor array ("PIR Array W") 86 and sensor array ("PIR Array X") 88 might be positioned on different walls to generate virtual beams in other directions and at other angles. Such an approach could be particularly advantageous in a larger area such as a living room or bedroom.

Figure 8:
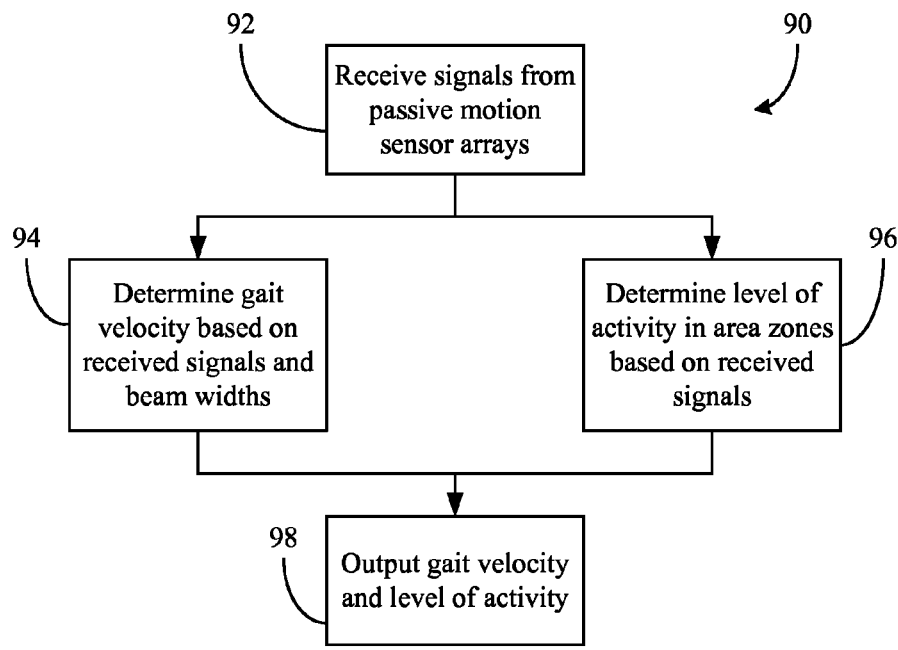
FIG. 8 is a flowchart of an example of a method of determining gait velocity and level of activity according to an embodiment.

Turning now to FIG. 8, a method 90 of determining gait velocity and level of activity is shown. The method 90 may be implemented in executable software as a set of logic instructions stored in a machine- or computer-readable medium of a memory such as random access memory (RAM), read only memory (ROM), programmable ROM (PROM), firmware, flash memory, etc., in fixed-functionality hardware logic using circuit technology such as application specific integrated circuit (ASIC), complementary metal oxide semiconductor (CMOS) or transistor-transistor logic (TTL) technology, or any combination thereof. For example, computer program code to carry out operations shown in method 90 may be written in any combination of one or more programming languages, including assembly language programming, an object oriented programming language such as Java, Smalltalk, C++ or the like and conventional procedural programming languages, such as the "C" programming language or similar programming languages.

Processing block 92 provides for receiving output signals from one or more passive motion sensor arrays. As already noted, the sensor arrays may include passive motion sensors that are angled so that the sensor arrays have lateral field of view edges that define one or more virtual beams. Thus, the output signals can indicate the order of activation/triggering of the passive motion sensors as well as the time differences between triggering events (e.g., time periods $\Delta t_1$-$\Delta t_{11}$, already discussed). A gait velocity determination can be made at block 94 based on the received signals and one or more distances between virtual beam edges. In one example, the distances between virtual beam edges are predetermined and stored to a memory location, wherein block 94 might include retrieving the distances from the memory location. In addition, levels of activity in area zones can be determined at block 96 based on the received signals and/or the distances between virtual beam edges. For example, if the monitored area is a household kitchen partitioned into multiple zones, the determination at block 96 might involve determining the amount of time the individual has spent washing dishes at the sink versus sitting at the kitchen table. Illustrated block 98 provides for outputting the determined gait velocities and levels of activity.

Figure 9:
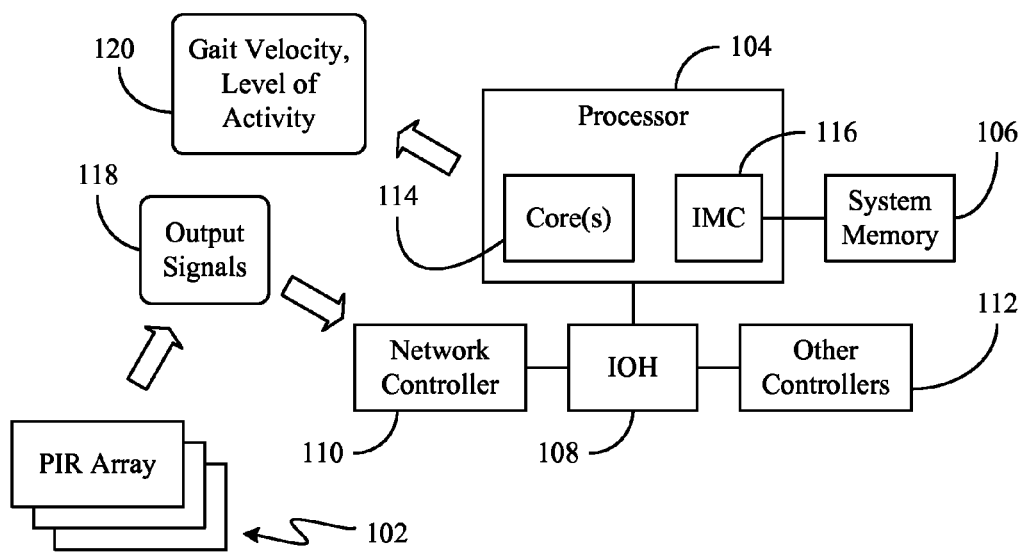
FIG. 9 is a block diagram of an example of a system according to an embodiment.

FIG. 9 shows a system 100 having one or more PIR arrays 102, a processor 104, system memory 106, an input/output hub (IOH) 108, a network controller 110, and various other controllers 112. Portions of the system 100 could be part of a mobile platform such as a laptop, personal digital assistant (PDA), mobile Internet device (MID), wireless smart phone, media player, imaging device, etc., or any combination thereof. In addition, the system 100 may also be part of a fixed platform such as a personal computer (PC), server, workstation, etc. Thus, the processor 104 may include one or more processor cores 114 capable of executing a set of stored logic instructions, and an integrated memory controller (IMC) 116 configured to communicate with the system memory 106. The system memory 106 could include dynamic random access memory (DRAM) configured as a memory module such as a dual inline memory module (DIMM), a small outline DIMM (SODIMM), etc.

The illustrated IOH 108, sometimes referred to as a Southbridge of a chipset, functions as a host device and communicates with the network controller 110, which could provide off-platform communication functionality for a wide variety of purposes such as cellular telephone (e.g., W-CDMA (UMTS), CDMA2000 (IS-856/IS-2000), etc.), WiFi (e.g., IEEE 802.11, 1999 Edition, LAN/MAN Wireless LANS), Low-Rate Wireless PAN (e.g., IEEE 802.15.4-2006, LR-WPAN), Bluetooth (e.g., IEEE 802.15.1-2005, Wireless Personal Area Networks), WiMax (e.g., IEEE 802.16-2004, LAN/MAN Broadband Wireless LANS), Global Positioning System (GPS), spread spectrum (e.g., 900 MHz), and other radio frequency (RF) telephony purposes. The network controller 110 might also use a wired data connection (e.g., RS-232 (Electronic Industries Alliance/EIA), Ethernet (e.g., IEEE 802.3-2005, LAN/MAN CSMA/CD Access Method), power line communication (e.g., X10, IEEE P1675), USB (e.g., Universal Serial Bus 2.0 Specification), digital subscriber line (DSL), cable modem, T1 connection), etc., to enable access to additional off-platform resources.

In the illustrated example, the network controller 110 obtains output signals 118 from the PIR arrays 102, and provides the output signals 118 to the processor 104 for filtering and/or further analysis. The processor 104 may execute logic that receives the output signals 118, identifies one or more orders of activation and one or more time differences based on the output signals 118, retrieves one or more distances between virtual beam edges from a memory location, and outputs gait velocity and levels of activity determinations 120. In addition, the other controllers 112 could provide support for user interface devices such as a display, keypad, mouse, etc. in order to allow a user to interact with and perceive information from the system 110. Thus, the gait velocity and levels of activity determinations 120 and other information could also be output via the other controllers 112. Additionally, portions or all of the gait velocity and levels of activity determinations 120 could be made locally at the PIR arrays 102 or at another intermediate component such as an aggregator.

Thus, techniques described herein can provide for an array assembly that is a single unit, does not require complex mounting or careful measurement, and produces sensed areas that are uniform, reducing inaccuracy in measurements. Moreover, the sensed area can be treated with a tightly controlled beam that can be aimed precisely to avoid areas and doors that are not of interest. In addition, individuals may approach the edges of the virtual beams at approximately right angles, which can further improve sensing accuracy. As a result, the techniques are particularly useful in household settings to assess the falls risk of individuals such as the elderly.

Embodiments of the present invention are applicable for use with all types of semiconductor integrated circuit ("IC") chips. Examples of these IC chips include but are not limited to processors, controllers, chipset components, programmable logic arrays (PLA), memory chips, network chips, and the like. In addition, in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. might be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

I claim:

1. A method comprising:
   receiving signals from a first passive motion sensor and a second passive motion sensor, wherein the first passive motion sensor has a lateral field of view with a first edge and the second passive motion sensor has a lateral field of view with a second edge that is substantially parallel to the first edge, and wherein the first and second edges define a first virtual beam; and
   determining a gait velocity based on the signals from the first and second passive motion sensors.

2. The method of claim 1, further including:
   receiving signals from a third passive motion sensor and a fourth passive motion sensor, wherein the first and second passive motion sensors define a first sensor array having lateral field of view edges that define a first plurality of virtual beams, wherein the third and fourth passive motion sensors define a second sensor array having lateral field of view edges that define a second plurality of virtual beams, and wherein the first and second plurality of virtual beams partition an area into a plurality of zones; and
   determining a level of activity in each of the plurality of zones based on the signals from the first, second, third and fourth passive motion sensors.

3. The method of claim 2, further including:
   determining one or more orders of activation and one or more time differences based on the signals from the first, second, third and fourth passive motion sensors; and
   determining the gait velocity and the level of activity based on the one or more orders of activation, the one or more time differences, and one or more distances between virtual beam edges.

4. The method of claim 3, further including retrieving the one or more distances between virtual beam edges from a memory location.

5. An apparatus comprising:
   a first passive motion sensor having a lateral field of view with a first edge; and
   a second passive motion sensor having a lateral field of view with a second edge that is substantially parallel to the first edge, wherein the first and second edges are to define a first virtual beam.

6. The apparatus of claim 5, wherein the first and second passive motion sensors are disposed horizontal to one another and the first virtual beam is to include a two-dimensional vertical beam, and wherein, if mounted to a wall of a hallway, the two-dimensional vertical beam is to be substantially perpendicular to a longitudinal axis of the hallway.

7. The apparatus of claim 5, further including a third passive motion sensor having a lateral field of view with a third edge, wherein the third edge is to further define the first virtual beam, and the first virtual beam is to include a substantially one-dimensional lateral beam.

8. The apparatus of claim 5, wherein the first and second passive motion sensors define a first sensor array, the apparatus further including a second sensor array having lateral field of view edges that are to define a second virtual beam.

9. The apparatus of claim 8, wherein the first sensor array further includes lateral field of view edges that are to define a third virtual beam and the second sensor array further includes lateral field of view edges that are to define a fourth virtual beam.

10. The apparatus of claim 9, wherein, if mounted to a wall, the first, second, third and fourth virtual beams are to be positioned to partition an area into a plurality of zones.

11. The apparatus of claim 5, further including one or more leveling indicators.

12. A system comprising:
    a first passive motion sensor having a lateral field of view with a first edge;
    a second passive motion sensor having a lateral field of view with a second edge that is substantially parallel to the first edge, wherein the first and second edges are to define a first virtual beam; and
    logic to,
      receive signals from the first and second passive motion sensors, and
      determine a gait velocity based on the signals from the first and second passive motion sensors.

13. The system of claim 12, wherein the first and second passive motion sensors are disposed horizontal to one another and the first virtual beam is to include a two-dimensional vertical beam, and, wherein, if mounted to a wall of a hallway, the two-dimensional vertical beam is to be substantially perpendicular to a longitudinal axis of the hallway.

14. The system of claim 12, further including a third passive motion sensor having a lateral field of view with a third edge, wherein the third edge is to further define the first virtual beam, and the first virtual beam is to include a substantially one-dimensional lateral beam.

15. The system of claim 12, wherein the first and second passive motion sensors define a first sensor array, the system further including a second sensor array having lateral field of view edges that are to define a second virtual beam.

16. The system of claim 15, wherein the first sensor array further includes lateral field of view edges that are to define a third virtual beam and the second sensor array further includes lateral field of view edges that are to define a fourth virtual beam.

17. The system of claim 16, wherein, if the first and second sensor arrays are mounted to a wall, the first, second, third and fourth virtual beams are to be positioned to partition an area into a plurality of zones.

18. The system of claim 16, wherein the logic is to,
    receive signals from the first and second sensor arrays, and determine a level of activity in each of the plurality of zones based on the signals from the first and second sensor arrays.

19. The system of claim 18, further including a memory, wherein the logic is to,
retrieve one or more distances between virtual beam edges from the memory,
determine one or more orders of activation and one or more time differences based on the signals from the first and second sensor arrays, and
determine the gait velocity and the level of activity based on the one or more orders of activation, the one or more time differences, and the one or more distances between virtual beam edges.

20. The system of claim 12, further including one or more leveling indicators.

* * * * *